(12) United States Patent
Sklyarevich et al.

(10) Patent No.: US 7,476,284 B2
(45) Date of Patent: Jan. 13, 2009

(54) METHOD AND APPARATUS FOR LAMINATING GLASS SHEETS

(75) Inventors: Vladislav Sklyarevich, Bensalem, PA (US); Mykhaylo Shevelev, Feasterville, PA (US)

(73) Assignee: Gyrotron Technology, Inc., Bensalem, PA (US)

( * ) Notice: Subject to any disclaimer, the term of this patent is extended or adjusted under 35 U.S.C. 154(b) by 0 days.

(21) Appl. No.: 11/900,099

(22) Filed: Sep. 10, 2007

(65) Prior Publication Data

US 2008/0060744 A1  Mar. 13, 2008

Related U.S. Application Data

(63) Continuation-in-part of application No. 11/453,409, filed on Jun. 15, 2006, now abandoned, and a continuation-in-part of application No. 11/340,045, filed on Jan. 26, 2006, now abandoned, which is a continuation-in-part of application No. 11/327,827, filed on Jan. 9, 2006, now Pat. No. 7,344,613, which is a continuation-in-part of application No. 10/802,626, filed on Mar. 17, 2004, now Pat. No. 7,063,760.

(51) Int. Cl.
B29C 65/00 (2006.01)
(52) U.S. Cl. ............... 156/104; 156/106; 156/272.2; 156/286; 156/382; 156/379.6
(58) Field of Classification Search ............ 156/87, 156/99, 104, 106, 272.2, 285, 286, 382, 379.6, 156/498
See application file for complete search history.

(56) References Cited

U.S. PATENT DOCUMENTS

| | | | | | |
|---|---|---|---|---|---|
| 2,163,648 | A | * | 6/1939 | Watkins et al. | 100/336 |
| 2,164,301 | A | * | 6/1939 | Watkins | 156/103 |
| 3,234,062 | A | * | 2/1966 | Morris | 156/104 |
| 4,175,162 | A | * | 11/1979 | De Boel et al. | 428/428 |
| 4,820,365 | A | * | 4/1989 | Brumm et al. | 156/109 |
| 5,196,676 | A | * | 3/1993 | Hallahan | 219/388 |
| 5,536,347 | A | * | 7/1996 | Moran | 156/103 |
| 6,342,116 | B1 | * | 1/2002 | Balduin et al. | 156/106 |
| 2003/0148114 | A1 | * | 8/2003 | Bourcier et al. | 428/432 |
| 2004/0000367 | A1 | * | 1/2004 | McGlinchy | 156/64 |
| 2004/0182493 | A1 | * | 9/2004 | Chick | 156/103 |

* cited by examiner

*Primary Examiner*—John L Goff
*Assistant Examiner*—Daniel McNally
(74) *Attorney, Agent, or Firm*—Carothers & Carothers

(57) ABSTRACT

The invention relates to a method and apparatus for laminating glass articles without using an autoclave. The sandwich structure to be laminated is preheated than is placed in a controllable vacuum and subjected to electromagnetic radiation with specified frequencies and power. The final heating is provided by convectional heat source. Pressure that is applied continuously during the radiating, heating and cooling steps is also specified for achieving an appropriate bond. An apparatus appropriate for realizing the invented process is also provided. The apparatus includes a loading table, three furnaces, and a cooling chamber which are adjusted to and adjoined to each to other. These parts provide the necessary conditions for high-quality laminating simple and multi-sandwich structures with high production rate and efficiency. The apparatus is inexpensive and fits into the space of two glass article lengths.

31 Claims, 2 Drawing Sheets

METHOD AND APPARATUS FOR LAMINATING GLASS SHEETS

CROSS REFERENCE

This application is a continuation-in-part of application Ser. No. 11/453,409, filed on 15 Jun. 2006 now abandoned, and application Ser. No. 11/340,045 now abandoned, filed on 26 Jan. 2006, which are continuations-in-part of application Ser. No. 11/327,827, filed on 9 Jan. 2006, now U.S. Pat. No. 7,344,613, which in turn is a continuation-in-part of application Ser. No. 10/802,626, filed on 17 Mar. 2004, now U.S. Pat. No. 7,063,760.

BACKGROUND OF THE INVENTION

1. Field of the Invention

Laminates provide a way of strengthening frangible material. The present invention relates to a method and apparatus for laminating glass articles and other frangible materials, wherein a plastic film is sandwiched between the articles.

Flat or non-flat glass articles, ceramics, polymers, or combinations of these materials may be laminated in accordance with the teachings of the present invention.

2. Discussion of the Prior Art

Laminates provide a way of strengthening frangible material, for example glass, so as to extend its uses and to render it safer to use in certain circumstances. Thus laminated glass products can be used for automotive and aircraft glazing, glass doors, balustrades, bulletproofing and many other uses where the glass product must be strong and/or shatterproof.

In conventional laminated glass products a sheet of glass is bonded to a layer of polymer adhesive film, and a further sheet or layer of material is bonded to the other side of the adhesive film layer, so that the adhesive film is sandwiched between two outer layers. If the glass sheet is then struck a blow it cracks or breaks, but does not shatter into small hazardous sharp pieces as the broken pieces are still bonded to and held in place by the polymer layer. If the laminated glass is used in a car windscreen, therefore, occupants of the car are not showered with broken glass upon breakage of the windscreen.

A number of methods for producing such laminates have been disclosed. For Example, see U.S. Pat. Nos. 5,268,049; 5,118,371; 4,724,023; 4,234,533; and 4,125,669. Laminated glass has been generally manufactured by a process wherein a stack of at least two sheets of glass having a plastic film called an intermediate film or laminating film, typically a plasticized polyvinyl butyrlal (PVB) film, sandwiched between each pair of adjacent sheets of glass which is subjected to evacuation, pressing and heating.

Usually this involves long heating under temperatures of around 80° C.-140° C. and high pressure, 4 MPa-20 MPa. The main problem encountered is that air is trapped between the film and glass surfaces, which air must be removed. This is required to prevent the laminate from bubbling. Removing the remainder of the air requires long heating and high pressure. The bubbling is a visible and objectionable defect that in most cases is absolutely unacceptable. Besides, bubbling within the laminate may reduce its strength in this area and cause de-lamination.

At the same time removing air is not an easy task because it is trapped between both sides of the plastic film and a glass sheet and there are only two mechanisms by which the air can escape: diffusion and dissolving in the film. Both processes are very slow, requiring long term heating and the application of high pressure. The bigger the glass sheet, the longer the time required. An especially long time is required for making multi-layer laminates. As a result, the productivity of such processes is low and they require considerable capital expenditure to set up the necessary costly apparatus, such as autoclaves.

Many prior art patents focus on the solution of problems related to the air escaping. In U.S. Pat. No. 5,268,049, glass sheets are spaced apart, and in the method described by U.S. Pat. No. 5,268,049, a liquid resin is used. In U.S. Pat. No. 4,234,533 the two sheets are held at an angle and in U.S. Pat. No. 5,118,371 the thickness of PVB gradually increases (or decreases) from the one side to the other side of the glass sheets. In U.S. Pat. No. 3,509,015 a method is described for producing laminated glass by sealing the periphery of two parallel glass sheets with pressure sensitive tape and forcing resinous material under pressure into the inter-sheet space. The resinous material is forced through a self-closing valve held in place with the tape while trapped air escapes through an aperture in the taped seam at the top of the cell. U.S. Pat. No. 4,125,669 describes a similar method in which two glass panes are sealed all around except for a filling opening and an aeration opening, and a binder material is introduced into the envelope thus formed in an amount calculated to exactly fill the envelope. Putty is applied to the openings just before emergence of the binder upon laying the filled envelope flat.

U.S. Pat. No. 3,315,035 describes a method involving the maintaining of the glass sheets in opposite relationship, heating the sheets to about 200° F. and injecting a resin composition containing a hardening agent, preheated to about 200° F., into the inter-sheet space and curing the assembled article. In U.S. Pat. No. 4,234,533 the seal around the sheets is formed by a gas-permeable, resin-impermeable material such as "Scotchmount". In some inventions (see for example U.S. Pat. Nos. 4,828,598 and 4,724,023) the laminating process is conducted in a vacuum. The vacuum environment helps air to escape and, in general, can reduce the level of trapped air. However, heating in a vacuum is always difficult, inefficient and therefore the laminating process still requires a long time. One more example is a method that was described in United States Patent Application Publication No. 2003/0148114. Total processing time was indicated as dozens of minutes. In addition, this method works with only special and expensive plastic material that has a moisture content below 0.35 percent.

A vacuum for de-airing is used in U.S. Pat. No. 6,340,045 as well. The heating and pressing processes are conducted in separate chambers that make the laminating quality unsatisfactory because of possible PVB shrinkage (nothing prevents this) and, what is more important, because nothing helps the PVB in flowing during heating. Rapid cooling and doing this without pressure makes the achievement of good laminates very questionable. In the patent " . . . electrical (radiative) heating elements . . . or convective heating" were used for heating in the chamber that is under vacuum. Heating in a vacuum by "convective heating" is impossible and heating by electrical elements in a vacuum without specifying the temperature of this heater is very insufficient. The described apparatus is long (at least five lengths of the glass being processed: two locks, heating chamber, pressing chamber, cooling site) and quite complex.

Thus, all the above described methods of air bubble removal, are not fully effective and are complicated, are very sensitive to moisture inside and outside the film, the apparatuses are massive and ineffective and still, in most cases, require long term heating (high energy consumption) and special expensive equipment, such as high pressure autoclaves.

At the same time, extremely large numbers of windshields, windows and other laminate products are made each year. Accordingly, there is a clear need in the art for a more effective and less expensive method for laminating glass sheets which eliminates expensive and massive equipment and reduces energy consumption.

SUMMARY OF THE INVENTION

According to the present invention, a method and apparatus are provided for laminating glass sheets and other frangible material with the thermal treatment of a laminating film that is processible by controlled heating which is fast and does not require the use of autoclave type furnaces. Products prepared using the method of the present invention include, but are not limited to, architectural glass, glass doors, balustrades, bulletproof glass, windshields, side windows and rear windows for vehicles such as automobiles and the like, as well as many other uses where the glass product must be strong and/or shatterproof, and comparable products. The inventive method utilizes short wave radiation such as microwave and/or infrared to rapidly apply heat in a vacuum to the adhesive film to be thermally treated.

The invented method comprises the assembly of a sandwich structure consisting of at least two glass articles separated by, and in contact with, at least one laminating film (usually this is plasticized polyvinyl butyral known as PVB), preheating at least one selected area of the articles to a temperature of approximately 55° C. to approximately 75° C. by a convectional heat source with uniformity over the articles outside surfaces of better than 5° C. Then the sandwich structure is subjected to a vacuum of approximately 1 kPa to approximately 20 kPa and the preheated articles are irradiated first by electromagnetic radiation with a frequency for which the skin layer in the glass article facing the radiation source and the film is more than the sum of their thicknesses to provide heating with uniformity over the surface of better than 5° C. A power density of the radiation is selected to be sufficient to heat the glass articles to a temperature of approximately 55° C. to approximately 105° C. with a heating rate of approximately 0.5° C./sec to approximately 5C° C./sec.

After reaching the required temperature the irradiation stops and sandwich structure is kept under vacuum for a time sufficient for equalizing the articles and film temperatures. After that the at least one selected area of the sandwich structure is irradiated a second time by the radiation to provide heating with uniformity of the glass article surface of better than 5° C. At this stage the power density is selected to be sufficient to heat the glass articles to a temperature of approximately 120° C. to approximately 135° C. with a heating rate of approximately 0.5° C./sec to approximately 5° C./sec.

After reaching this temperature level the irradiation stops and the sandwich is subjected to a atmospheric pressure and at least one selected area of the articles is heated by a convectional heat source to a predetermined film bonding temperature for selected adhesion.

Simultaneously, while applying irradiation, keeping the sandwich under the vacuum, and heating, the pressure is selected to be P (in Pa) around 14×{remaining partial pressure of air and moisture seepage from the film at the end of the heating}$^{1/2}$ (in Pa)×exp {0.3×(150° C. minus selected bonding temperature)} (in °C.)×{a moisture content of the film material} (in percent by weight) and these conditions are applied in a continuous manner.

After completion of the heating, the sandwich heated area is cooled down under the selected pressure or higher pressure whereby an appropriate bond is obtained between the laminating film and glass articles in the selected area.

A multi-glass article structure can be also made by the method of the present invention. For this, the previously processed and cooled sandwich structure is assembled with one additional glass article that is separated by, and contacted with, the processed structure by, at least, one additional laminating film. The method of the present invention allows the repeat of this process many times.

An apparatus for realization of the method of the present invention is comprised of a loading table, three furnaces, and a cooling chamber with conveyors for positioning the structure and moving it through the apparatus as well as for oscillating the structure inside furnaces.

The first furnace has a source of convectional heating of at least one selected area of the glass article surfaces to a temperature of approximately 55° C. to approximately 75° C. with uniformity of better than 5° C.

The second furnace is a hermetic chamber connected to a vacuum system, and having electromagnetic radiation emitters that provide heating according to the method of the present invention. The emitters are electrodynamic mirrors that transmit the microwave radiation or infrared lamps radiation or a combination of them. There are means inside the chamber for providing controllable distribution of the radiations over at least one selected area of the structure. The means includes, but are not limited to, a controller for individually activating the emitters, movable electrodynamic mirrors, oscillating the sandwich under emitters, and/or using infrared reflectors with high reflection coatings. The second furnace also has the pressure means for applying the selected pressure to the area continuously during the oscillation.

The third furnace has a source of convectional heating to heat at least one selected area of the glass article surfaces and the film to a predetermined film bonding temperature for selected adhesion, the pressure means for applying the selected pressure to the area being applied continuously during the heating and oscillating.

The cooling chamber has not less than three intakes and each of them is configured with turns in the furnace exit. The intakes are moving by use of a vertical conveyor and each intake has a horizontal conveyor for accelerated conveyance of the processed structure from the chamber into and out of the intake.

The second and third furnaces, as well as the cooling chamber of the apparatus of the present invention, has an arrangement for applying selected pressure during heating and cooling that is provided by rollers, floated rollers, or their combination. A set of flexible appliances, transparent to the radiation, is used for pressing mainly non-flat articles during the heating and cooling. Cooling is provided by a stream of normal pressure air created by a fan or pressurized air from a compressor.

The main advantages of this high-speed method are reduction of manufacturing costs and increase of production rate. Many other specific advantages also exist including but not limited to increasing of production yield and the opportunity for process automation.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF THE PREFERRED EMBODIMENTS

Figure 1:
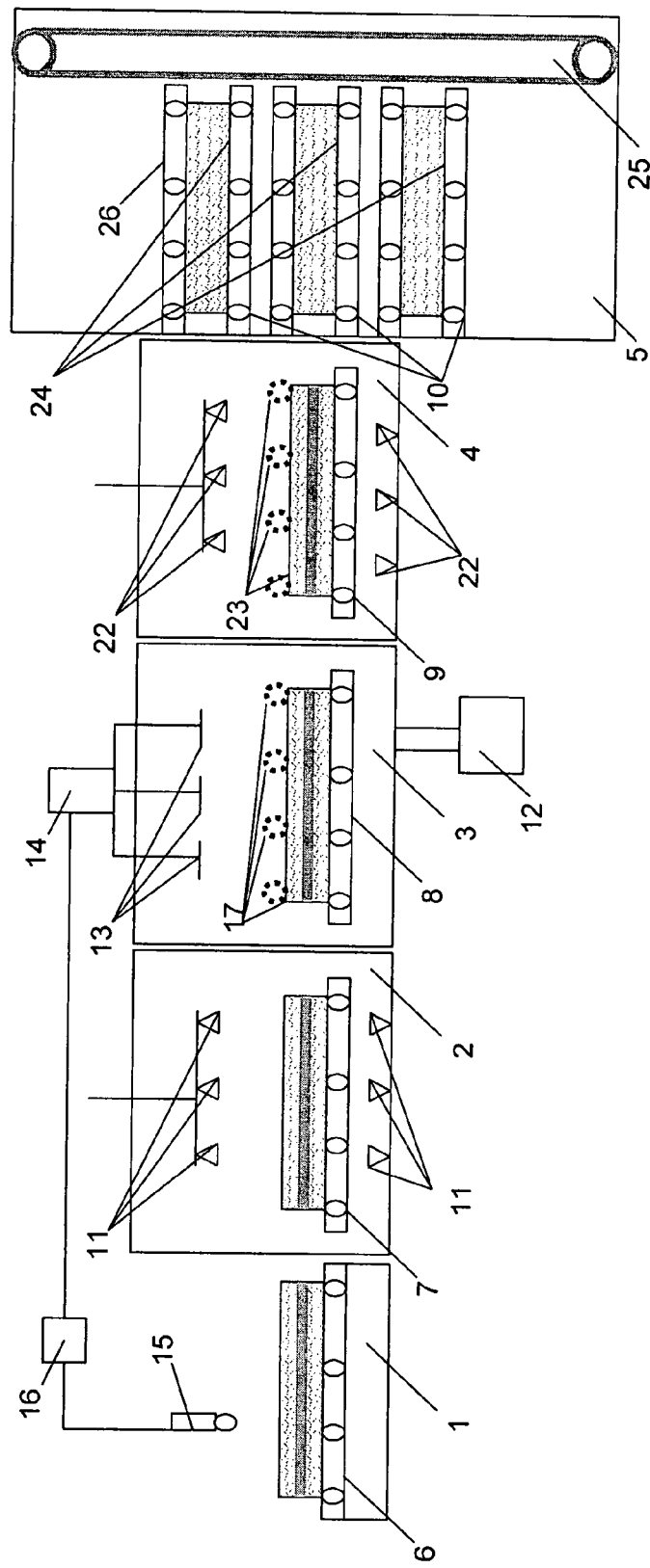
FIG. 1 is a schematic layout of the apparatus of the present invention for laminating glass articles FIG. 2 schematically illustrates the position, and layout of the electromagnetic radiation emitters when pressing is provided by rollers.

The present invention relates to a method of laminating frangible materials, preferably glass articles, without using autoclave type furnaces.

The invented method comprises the assembly of a sandwich structure consisting of at least two glass articles separated by, and in contact with, at least one laminating film (usually this is plasticized polyvinyl butyral known as PVB). The at least one selected area of resulting sandwich is preheated first to a temperature of approximately 55° C. to approximately 75° C. by a convectional heat source, for example, hot air. The preheating temperature is selected to be lower than the temperature under which the film can be stacked to the glass.

After preheating the sandwich structure is subjected to a vacuum and it is irradiated first by electromagnetic radiation. When the preheated assembled sandwich is placed in a vacuum, pressured, and irradiated by electromagnetic radiation, the following processes take place. In the beginning while the film is not stuck to the glass articles, the air and moisture that was captured in between the film and glass articles are pumped out and the pressure of the remaining gases becomes equal to the surrounding pressure in the chamber. As the temperature is raised, the water that is always present inside the film is evaporated from the film and creates steam in between the film and glass articles. This steam is also pumped out and the partial pressure between the film and glass is equal to the surrounding pressure in the chamber as well. The described process takes place up to the moment when the further-heated film partially sticks to the glass, closing some paths for further pumping of the evaporated water steam. This temperature is approximately 95° C. to approximately 105° C.

In the invented method an electromagnetic radiation is used with a frequency for which the skin layer in the glass article facing the radiation source and the film is more than the sum of their thicknesses. When electromagnetic radiation meets with a sandwich, it penetrates inside it and heats the glass articles and film, losing energy: $I(x)=I(0) \exp(-x/\lambda)$, where $I(x)$ is the distribution of the radiation energy lost along the coordinate x—in the sandwich in the direction of radiation propagation; $I(0)$ is the beginning level of the energy; and $\lambda$ is the total sandwich absorption coefficient. The $\lambda$ depends, first of all, on the radiation frequency and represents material electrodynamic properties (conductivity, molecular structure, etc.)

In the invented method the frequency is selected so that the coefficient $\lambda$ becomes equal to the distance x (that is the selected thickness of the sandwich that is needed to be heated). Most of the energy (63%) is used and the temperature difference between the layers inside the material will be less. This thickness of penetration is known as the skin layer.

However, the glass articles and film always are heated to a different temperature. It happens because the film, which is usually a polar polymer, always has a higher absorption of the radiation than glass, and the longer heating time the greater is this difference. Film overheating can have a negative impact on final quality of the laminated structure. Therefore in the invented method the irradiating process is stopped when glass article temperature the above mentioned level (95° C.-105° C.) and the sandwich is maintained under vacuum for a time sufficient for equalizing the articles and film temperatures. After that the at least one selected sandwich structure area is irradiated again by electromagnetic radiation up to the moment when the heated film fully sticks to the glass, closing all paths for further pumping of the evaporated water steam. This happens when the film temperature reaches approximately 120° C. to approximately 135° C.

The next step in the invented method is a final heating of at least one selected area of the sandwich structure under an atmospheric pressure by a convectional heat source to a predetermined film bonding temperature for selected adhesion and than cooling the heated area whereby an appropriate bond is obtained between the laminating film and the glass articles in at least the selected area.

The radiation with sufficient power/power density, can provide a very high heating rate (production rate) because it does not create any significant stresses in the glass articles, it provides equal conditions for adhesion from the film on both sides, and a highly efficient heating process. However, a heating rate that is too high reduces pumping time and increases the quantity of remaining water inside the film. It was found that heating faster than around 5° C. per second is not appropriate because it requires a high pressing pressure with very high uniformity. In fact, heating that is too fast requires the use of an autoclave. It also creates a problem for the heating process because it requires very high uniformity. Slower heating makes heating and pressing easy but reduces the production rate. In the present invention, the lower limit of the heating rate is around 0.5° C. per second, providing a reasonable, generally acceptable minimal production rate.

In general, the higher the heating uniformity is, the better is the quality of the bond that can be achieved in glass laminating process. However, keeping high heating/irradiating uniformity requires more complicated and expensive heat sources, controllers, temperature measurement, and so forth. It was found that the uniformity for irradiating over the glass article surface of around 5° C. is appropriate for the selected heating rate and provides a high quality bond. Such heating uniformity is kept as well during preheating and heating in the invented method.

In the present invention, the vacuum pressure level is determined to be at least 20 kPa. Achieving a level lower than 20 kPa requires an expensive evacuation system and this is not reasonable because it has insignificant advantages for the pressing and heating process, as well as for the final laminate quality. It has been found that subjecting the structure to a vacuum level higher than 20 kPa is also not appropriate because the required pressure for pressing is raised dramatically and makes the pressing process very complicated and expensive (more air and water remain).

In the invented method the pressure is applied in a continuous manner to the glass articles during irradiation, while maintaining the sandwich under vacuum, heating, and cooling. As the film temperature is raised, the applied mechanical pressure provides dissolving of the remaining gases (air and steam) back into the film. The applied pressure also assists the film material flowing, promoting the adhesion process and preventing the return of the gases into the film and thereby creating bubbles.

It was found that for the heating rate range, the pressure that needs to be applied during the structure heating (in Pa) should be about: 14 (coefficient)×{vacuum pressure in the chamber}$^{1/2}$ (in Pa)×exp {0.3×(150° C. minus selected bonding temperature)} (in °C.)×{a moisture content of the film material} (in percent by weight). A pressure less than this will require less remaining air (higher vacuum) than that mentioned and is not reasonable. The higher pressure can deform the structure that is usually not laying on a flat solid support, for example on conveyer rollers.

In the embodiments of the present invention discussed above the convectional heat source is hot gaseous matter. It can be air heated by electrical heaters, hot natural gas, or similar means.

In the embodiments of the present invention discussed above the electromagnetic radiation is selected from a high frequency microwave radiation band range or infrared band range.

In the embodiments of the present invention discussed above each of the process applications: preheating, irradiating under vacuum, heating, and cooling, is performed at a separate site. For the irradiating under vacuum the site is a hermetic chamber.

In the embodiments of the present invention discussed above the sandwich is oscillated during the preheating, irradiations, maintaining the sandwich under vacuum, and heating, which increases the uniformity of heating.

In the embodiments of the invention discussed above, the mechanical pressure during irradiation, maintaining the sandwich under vacuum, heating, and cooling is accomplished by rollers or by a set of flexible appliances transparent to the radiation. In the case of using rollers the oscillating amplitude is equal to the distance between the rollers. This compensates for the irregular approach of the radiation or convectional heat to the glass articles that can be shadowed by the pressing rollers.

In the embodiments of the invention discussed above the pressure is created by a set of floating rollers that are uniformly spread over the sandwich with a distance between them of approximately 25 glass article thicknesses to approximately 50 glass article thicknesses. The select distance prevents the structure from deforming.

In the embodiments of the invention discussed above the time of maintaining the sandwich under vacuum without the irradiation is determined to be about the ratio of the glass article thickness in the second power to the glass article temperature conductivity. It was found that during this time the temperature difference between the film and the glass articles does not impact the final bonding quality.

A sandwich structure that consists of more than two glass articles can be laminated by the invented method. For this, at least one additional laminating film is placed between a sandwich structure previously processed by the invented method and additional glass articles and the resulting multi-sandwich structure is processed according to invented method as is described above. For a laminate structure with 4, 5 or more glass articles, the described process is repeated a corresponding number of times.

In the embodiments of the invention discussed above pressurized air is used for cooling the structure.

The apparatus of the present invention is provided for laminating, by the described method, a sandwich structure which consists of at least two glass articles separated by, and in contact with, at least one laminating film. The apparatus includes a loading table (1) (see FIG. 1), the first (2), second (3), and third (4) furnaces and cooling chamber (5). The loading table and each furnace as well as a cooling chamber have a conveyor (6), (7), (8), (9), (10) for positioning the structure and to provide its movement. The conveyers (7), (8), (9) of the furnaces provide an oscillation as well. All parts are adjusted and adjoined to one other. A common assembly table can be used as a loading table (1).

The first furnace (2) has a source of convectional heating (11, See FIG. 1) and the at least one selected area of the glass article surfaces is heated here to a temperature of approximately 55° C. to approximately 75° C. with a uniformity of better than 5° C. As said source, for example, a set of nozzles blowing hot gaseous matter may be used. To provide the necessary uniformity the nozzles are spread uniformly over the glass article surfaces on both sides.

The second furnace (3) has a hermetic chamber. It is connected to a vacuum system (12) that creates the selected vacuum inside the chamber as specified in the method, in the range of about 20 kPa. The furnace (3) has electromagnetic radiation emitters (13) inside that provide heating of at least one selected area of the film and adjoining glass article surfaces. The emitters are connected to a controller (14) that switch the emitters on and off and controls the power of the radiation to provide heating of the at least one selected area of the glass articles surfaces to a temperature of approximately 135° C. with a heating rate of approximately 0.5° C./sec to approximately 5° C./sec. It also has a radiation means for providing controllable distribution of electromagnetic radiation with uniformity over the surface better than 5° C.

The emitters are electrodynamic mirrors when the radiation is high frequency microwave, or short, medium, or long wave infrared lamps, or a combination of them. The controllable distribution of radiation is provided by a means that includes, but are not limited to, a set of individually activated emitters, infrared reflectors with high reflection coatings, scanning and/or movable electrodynamic mirrors, an optical system (15) at a loading table for scanning the position of the sandwich structure or a group of them thereon, and a computer (16), programmable by the system for controlling the means.

The second furnace (3) has a pressure means for applying the pressure that is specified in the invented method continuously during irradiating. This means includes, but is not limited to, rollers, as well as floating rollers, a set of flexible appliances transparent to the short wave radiation, or a combination of them.

Figure 2:
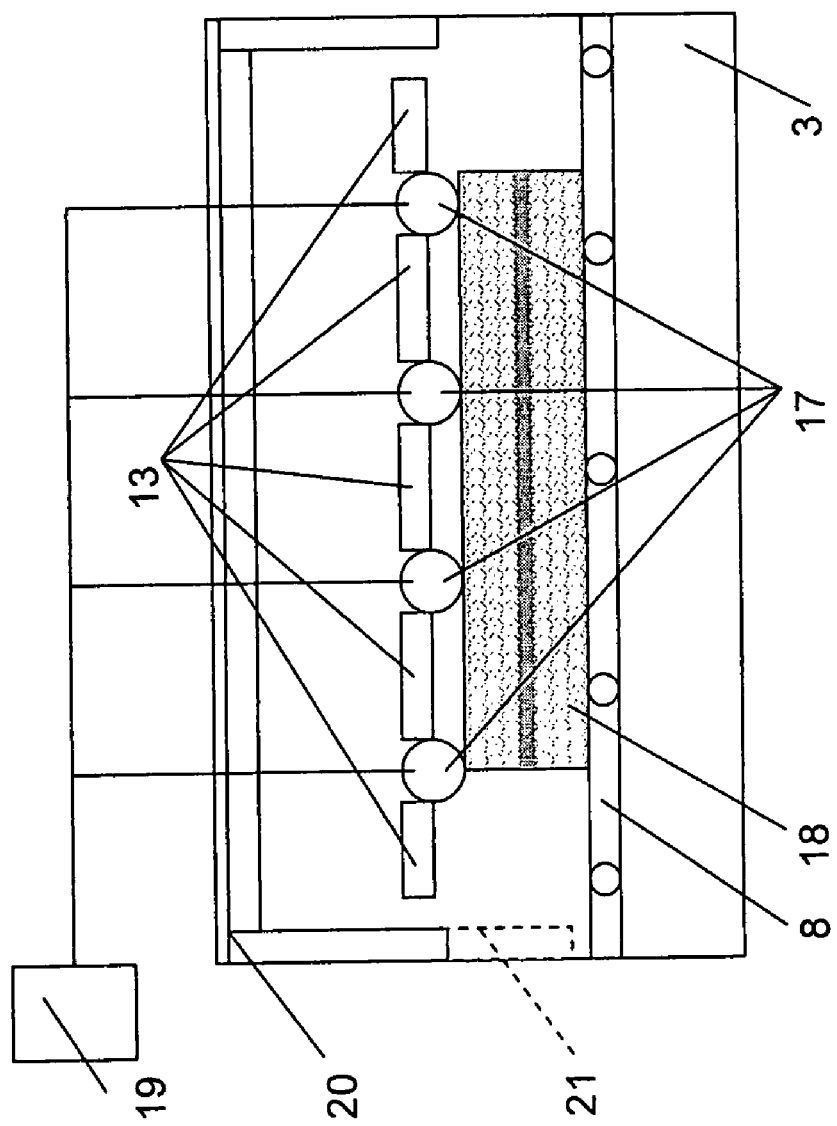

In the case of using the rollers the emitters (13) (see FIG. 2) are fixed between rollers (17) and the sandwich structure (18) is oscillated by the chamber conveyor (8) during irradiating. This increases the uniformity of heating which increases the final quality of the product. For the same reason, as well as for uniformity of pressure, the floating rollers are positioned in the direction of the conveyor movement with a distance between them of approximately 25 glass article thicknesses to approximately 50 glass article thicknesses which provides the pressing of the sandwich by at least two rollers simultaneously at any time, and with a distance between them of not more than approximately 25 glass article thicknesses to approximately 50 glass article thicknesses in perpendicular to the conveyor movement. The rollers have a lifting unit (19) that raises them before heating to provide space between them and the chamber conveyor that is bigger than the sandwich structure thickness.

In the embodiments of the invention discussed above the hermetic chamber has a retractable roof (20) (see FIG. 2) or hermetic gates (21) that make possible continuous production in line.

The third furnace (4) (see FIG. 2) has a source of convectional heating (22) to heat at least one selected area of the glass article and the film to a predetermined film bonding temperature for selected adhesion. As said source, for example, a set of nozzles blowing hot gaseous matter is used. To provide the necessary uniformity the nozzles are spread uniformly over the glass article surfaces on both sides. The furnace (4) has the same pressure means as in the second furnace for applying the selected pressure to the area continuously during heating and oscillating. In case of using the rollers (23) (see FIG. 1) the convectional heat sources (22) are fixed between rollers and the sandwich structure is oscillated by the chamber conveyor (9) during heating.

The cooling chamber (5, see FIG. 1) has not less than three intakes (24) that are moved by conveyor (25) in a vertical direction. Each intake has a horizontal conveyer (10) for accelerated conveying of the processed structure from the chamber into and out of the intake. Each intake has a pressure means (26) similar to what is described above, that presses the sandwich with pressure equal to or higher than that which is selected for the heating cycle.

The cooling system for reducing the sandwich temperature to the selected safe level includes, but is not limited to, a set of fans, pressurized air, or a combination of them. In the case of using pressurized air, the cooling chamber is a hermetic chamber.

The invented method and apparatus provide for laminating glass articles without using an autoclave and are free from all autoclave problems. The apparatus is inexpensive, take less space and energy, and provides the opportunity to laminate any kind of glass article, including tempered and coated glass etc., as well as, multi-structures having many glass articles. The method and apparatus can be the basis for high production laminating lines. Only common simple parts such as washing, drying, unloading, etc. need to be added. The invented method and apparatus can be used for retrofitting into existing lines as well, liberating production from the problems of autoclave use and batch processing. The apparatus of the present invention can also be installed in parallel with an existing autoclave line for making laminates while the autoclave is running. This will double, or even triple production.

The invented method and apparatus ensure a high quality laminate that has been proven by testing laminate samples that were made by using the invention.

Samples of flat soda-lime glass articles 12" by 12" (300×300 mm) and 16"×30" (406×760 mm), 3/16" (4.76 mm) thick with one layer of PVB 0.03" (0.7 mm) thick in each sample were made by the invented method and apparatus. The assembled sandwiches were placed in the vacuum chamber with a vacuum of 150 mm Hg (20,000 Pa) and irradiated by infrared lamps with a wavelength of 1.26 microns for which the measured skin layer was around 5 mm. Behind the lamps, polished brass reflectors were installed. The total power of the infrared lamps used was 6 kW for samples 300×300 mm, and 22 kW for samples 406×760 mm. The selected bonding temperatures were between 137° C. and 145° C. The mentioned power level used provided a heating time of around 50 sec with a heating rate of around 2.4° C./sec. The PVB moisture content was between 0.5% and 1.1%. For this data, applied pressures were estimated to be between $P=14\times20,000^{1/2}$ (Pa)×exp $\{0.3\times(150-137)\}\times1.1(\%)=14\times141\times\exp(3.9)\times1.1=1610\times49.4=79,5$ kPa=0.8 kg/cm$^2$ and $P=14\times20,000^{1/2}$ (Pa)×exp $\{0.3\times(150-147)\}\times0.5(\%)=805\times2.5=2,000$ Pa or 0.02 kg/cm$^2$. The samples were pressed by rollers.

The samples successfully passed official safety glass tests: impact, boiling, and pummel. Results of the tests are attached as Appendix I. Samples of flat soda-lime glass articles 12" by 12" (300×300 mm), 3/16" (4.76 mm) thick with one layer of PVB in each, that had different moisture contents, were processed by the invented method using the invented apparatus and tested by DuPont's testing lab. (DuPont is one of the major PVB manufacturers).

Below are results of sample baking tests.

| | | Ts&d 06-0211 Gyrotron | | | | | | | |
|---|---|---|---|---|---|---|---|---|---|
| | | INTO OVEN | | | | | | | |
| | 6:30 | | 8:30 | | 10:30 | | 12:30 | | 2:30 |
| | | | | | TEMP deg C./deg F. | | | | |
| | | | 105/221 | | 120/248 | | 135/275 | | 150/302 |
| SAMPLE | | | BUBBLE COUNT AT TEMPERATURE (INSIDE AND OUTSIDE OF ½ INCH) | | | | | | |
| CODE | INITIAL COUNT | INSIDE | OUTSIDE | INSIDE | OUTSIDE | INSIDE | OUTSIDE | INSIDE | OUTSIDE |
| 1 PVB 1 | 0 | | 0 | | 0 | | 0 | | 0 |
| 2 PVB 2 | 0 | | 0 | | 0 | | 0 | | 0 |
| 3 PVB 3 | 0 | | 0 | | 0 | | 0 | | 0 |
| 4 PVB 4 | 0 | | 0 | | 0 | | 0 | | 0 |
| 5 SGP 1C | 0 | | 0 | | 0 | | 0 | | 0 |
| 6 SGP 2C | 0 | | 0 | | 0 | | 0 | | 0 |

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

We claim:

1. A method for laminating glass articles, comprising:
   assembling a sandwich structure consisting of at least two glass articles separated by at least one laminating film;
   preheating at least one selected area of the articles to a temperature of approximately 55° C. to approximately 75° C. by a convectional heat source with uniformity over the articles outside surfaces of better than 5° C.;
   subjecting said sandwich structure to a vacuum pressure of at least 20 kPa;
   irradiating first at least one selected area of said sandwich structure by electromagnetic radiation with a frequency to provide heating with uniformity over the surface over the surface of an article facing a radiation source of better than 5° C.; and having a power density sufficient to heat the glass articles to a temperature of approximately 95° C. to approximately 105° C. with a heating rate of approximately 0.5° C./sec to approximately 5° C./sec;

maintaining the sandwich under vacuum without irradiating for a time sufficient for equalizing the articles and film temperatures;

irradiating second at least one selected area of said sandwich structure by electromagnetic radiation to provide heating with uniformity of the glass article surface facing the radiation source of better than 5° C.; and having a power density sufficient to heat the glass articles to a temperature of approximately 120° C. to approximately 135° C. with a heating rate of approximately 0.5° C./sec to approximately 5° C./sec;

subjecting said sandwich structure to an atmospheric pressure and heating, at least one selected area of the articles by a convectional heat source to a predetermined film bonding temperature for selected adhesion;

applying pressure in a continuous manner during the irradiations, while maintaining the sandwich under the vacuum and heating, which is selected to be P(in Pa) about $14 \times \{$remaining partial pressure of air and moisture seepage from the film at the end of the heating$\}^{1/2}$ (in Pa)$\times$exp $\{0.3\times(150°$ C. minus selected bonding temperature)$\}$ (in °C.)$\times\{$a moisture content of the film material$\}$ (in percent by weight); and cooling said heated area under the selected pressure whereby an appropriate bond is obtained between said laminating film and said glass articles in at least said selected area.

2. The method of claim 1, wherein the sandwich is oscillated during preheating, irradiation, maintaining the sandwich under the vacuum, and heating.

3. The method according to claim 2, wherein spaced rollers create the pressure.

4. The method according to claim 3, wherein the oscillating amplitude is equal to the distance between the rollers.

5. The method according to claim 2 wherein the applied pressure is created by a set of floated rollers that are uniformly spread over the sandwich with a distance between them of approximately 25 glass article thicknesses to approximately 50 glass article thicknesses.

6. The method according to claim 5 wherein the oscillating amplitude is equal to the distance between the rollers.

7. The method of claim 1, wherein said electromagnetic radiation with said frequency is selected from a high frequency microwave radiation band range.

8. The method of claim 1, wherein said electromagnetic radiation with said frequency is selected from the infrared band range.

9. The method of claim 1, wherein the pre-heating by a convectional heat source is performed at a separate site.

10. The method of claim 1, wherein the irradiating under a maintained vacuum is performed at a separate site in a hermetic chamber.

11. The method of claim 1, wherein the heating by convectional heat source is performed at a separate site.

12. The method of claim 1, wherein cooling is performed at a separate site. the distance between the rollers.

13. The method of claim 1, wherein the convectional heat source is hot gaseous matter.

14. The method according to claim 1, wherein the time of keeping the sandwich under the vacuum without the irradiating is equal to about the ratio of the glass article thickness in the second power to the glass article temperature conductivity.

15. The method according to claim 1, wherein the sandwich structure consists of a previously processed and cooled sandwich structure and one additional glass article that is separated from the processed structure by at least one additional laminating film.

16. An apparatus for laminating a sandwich structure consisting of at least two glass articles separated by at least one laminating film comprising:

a loading table with a conveyor for positioning the structure on the table and for movement from the table into a first furnace;

said first furnace having a conveyor for conveying said structure from the table to inside the furnace and conveying said structure out of the first furnace as well as oscillating the structure, and a source of convectional heating for at least one selected area of the glass article surfaces to a temperature of approximately 55° C. to approximately 75° C. with uniformity of better than 5 C, a second furnace having a hermetic chamber connected to a vacuum system that provides a vacuum of at least 20 kPa and having a conveyor for conveying said structure from the first furnace to inside the hermetic chamber and conveying said structure out of the second furnace, as well as oscillating the structure, a set of electromagnetic radiation emitters that provide heating for at least one selected area of the glass articles to a temperature of approximately 135° C. with a heating rate of approximately 0.5° C./sec to approximately 5° C./sec; a radiation means for providing controllable distribution of electromagnetic radiation with uniformity over the area surface better than 5° C., a pressure means for applying a selected pressure in Pa that is about $14 \times \{$remaining partial pressure of air and moisture seepage from the film at the end of the heating$\}^{1/2}$ (in Pa)$\times$exp $\{0.3\times(150°$ C. minus selected bonding temperature)$\}$ (in °C.)$\times\{$a moisture content of the film material$\}$ (in percent by weight) to the heated structure area continuously during the heating and oscillating;

a third furnace having a conveyor for conveying the structure from the second furnace and conveying said structure out of the third furnace as well as oscillating the structure, a source of convectional heating to heat at least one selected area of the glass article surfaces and the film to a predetermined film bonding temperature for selected adhesion, and pressure means for applying the selected pressure to the selected area continuously during the heating and oscillating; and a chamber for cooling said sandwich as processed that is adjacent to the third furnace and having not less than three intakes whereby each intake is presented in turn to the third furnace exit by a vertical conveyor, and each of said intakes having a horizontal conveyor for conveying the processed structure from the third furnace into and out of the intake, and a pressure means for applying the selected pressure applied during heating, and a cooling system for reducing the temperature of said sandwich temperature to a selected safe level.

17. The apparatus defined in claim 16, wherein the pressure means for applying the selected pressure includes floating rollers.

18. The apparatus defined in claim 17, wherein the rollers are positioned in the direction of the conveyor movement with a distance between them of approximately 25 glass article thicknesses to approximately 50 glass article thicknesses that provides the pressing of said sandwich by at least by two rollers simultaneously at any time and have a distance between them of not more than approximately 25 glass article thicknesses to approximately 50 glass article thicknesses in perpendicular to the conveyor movement.

19. The apparatus defined in claim 16, wherein said source of convectional heating is a set of nozzles blowing hot gaseous matter.

20. The apparatus defined in claim 19, wherein the cooling system includes a set of fans.

21. The apparatus defined in claim 16, wherein said electromagnetic radiation emitters include electrodynamic metal mirrors that transmit and shape the microwave radiation.

22. The apparatus defined in claim 16, wherein said electromagnetic radiation emitters are short wave infrared lamps.

23. The apparatus defined in claim 16, wherein said electromagnetic radiation emitters are medium wave infrared lamps.

24. The apparatus defined in claim 16, wherein said electromagnetic wave radiation emitters are long wave infrared lamps.

25. The apparatus defined in claim 16, wherein the radiation means for providing controllable distribution of the radiation includes a controller for individually activating the emitters.

26. The apparatus defined in claim 16, wherein the radiation means for providing controllable distribution of electromagnetic radiation includes infrared reflectors with high reflection coatings.

27. The apparatus defined in claim 16, wherein the pressure means for applying the selected pressure includes rollers.

28. The apparatus defined in claim 16, wherein the emitters are fixed between rollers and the sandwich structure is oscillated by the chamber conveyor during heating.

29. The apparatus defined in claim 16, wherein the hermetic chamber has a retractable roof.

30. The apparatus defined in claim 16, wherein the hermetic chamber has hermetic gates.

31. The apparatus defined in claim 16, wherein the electromagnetic radiation emitters are a combination of infrared lamps.

* * * * *